United States Patent
Egli

[15] 3,674,105
[45] July 4, 1972

[54] DRIVE AXLE FOR WIDE-TRACK CRAWLER VEHICLES

[72] Inventor: John Alfred Egli, Dubuque, Iowa
[73] Assignee: Deere & Company, Moline, Ill.
[22] Filed: Oct. 30, 1970
[21] Appl. No.: 85,376

[52] U.S. Cl. ........................................... 180/9.48, 180/9.62
[51] Int. Cl. ............................................... B62d 55/12
[58] Field of Search .................... 180/9.62, 9.48; 301/128

[56] References Cited

UNITED STATES PATENTS

| | | | |
|---|---|---|---|
| 1,574,041 | 2/1926 | Bager et al. | 180/9.62 |
| 2,518,481 | 8/1950 | Maguire | 180/9.62 |
| 2,804,157 | 8/1957 | Preston | 180/75 |

FOREIGN PATENTS OR APPLICATIONS

| | | | |
|---|---|---|---|
| 756,623 | 9/1933 | France | 180/72 |

Primary Examiner—Philip Arnold
Attorney—H. Vincent Harsha, Harold M. Knoth, William A. Murray, John M. Nolan and Raymond L. Hollister

[57] ABSTRACT

A crawler vehicle has a pair of extra wide, high-flotation tracks respectively supported on a pair of fore-and-aft extending track frames on opposite sides of the vehicle, the track frames being rigidly connected to the main frame. A pair of drive axles respectively extend outwardly a relatively short distance from a pair of final drive housings at opposite sides of the rear end of the main frame and the drive axles are respectively connected to a pair of rearward drive sprockets, which drivingly engage the rear end of the tracks and are spaced outwardly from the ends of the axles, by means of a pair of axle extension members, the inner ends of which are drivingly connected to the outer ends of the axles by means of flexible couplings, which permit a small amount of tilting of the axle extension members relative to the drive axles. The outer ends of the axle extension members are respectively journaled in the respective track frames by means of self-aligning bearings, which accommodate the tilting of the axle extension members.

7 Claims, 2 Drawing Figures

INVENTOR.
JOHN A. EGLI

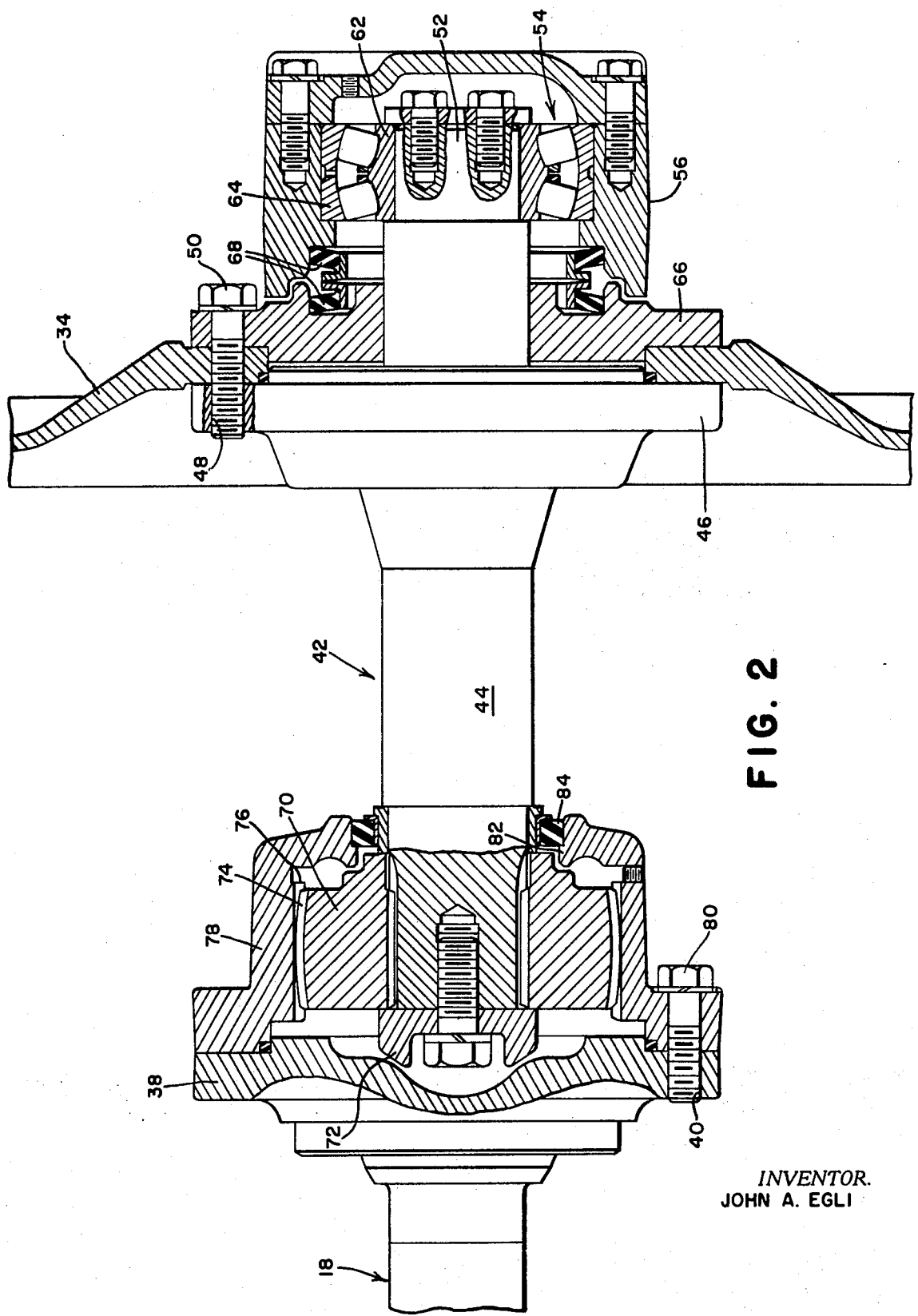

3,674,105

DRIVE AXLE FOR WIDE-TRACK CRAWLER VEHICLES

BACKGROUND OF THE INVENTION

It is known to provide extra wide tracks as an option for crawler-type tractors, the wide tracks being used when the vehicle requires more than the usual amount of flotation, such as when the vehicle is being operated on snow or other soft footing. Since it is desirable that the drive sprockets engage the tracks at approximately the centerline of the tracks, the use of such extra wide tracks has necessitated the provision of an extension onto the drive axles to space the drive sprockets further outwardly from the sides of the vehicle.

Heretofore, when the optional wide tracks have been used, the axle extensions have been rigidly secured to the outer ends of the axles. However, since the axles must support a radial load while transmitting a high torque, the application of the radial load through the drive sprockets a greater distance outwardly of the final drive housings has resulted in a much higher stress in the axles, leading to premature axle failure. Of course, the above applies to that type of crawler tractor wherein the axles extend outwardly from the final drive housings in cantilevered fashion and are not journaled in the track frames, which are relatively rigidly connected to the main vehicle frame. To overcome the above problem, the outer ends of the axle extensions can be supported on the track frame. However, this creates a new set of problems, since during operation of the vehicle, there is some deflection of the track frame relative to the main frame causing a misalignment between the axis of the drive axle and the journal for the outer end of the axle extension on the track frame. The above misalignment can also occur due to the usual inaccuracies in the manufacture and assembly of the components.

SUMMARY OF THE INVENTION

According to the present invention, a novel structure is provided for extending the axles of a crawler-type vehicle when extra wide, high-flotation tracks are used. More specifically, an axle extension is provided wherein the outer end of the axle extension is supported on the track frame to reduce the stress in the axle. Also according to the invention, means are provided to accommodate axial misalignment between the axle and the journal at the outer ends of the axle extensions on the track frame, such as caused by deflections in the frames during operation or by tolerance during the manufacture and assembly of the components.

An important feature of the invention resides in the use of a flexible splined coupling between the outer end of the axle and the inner end of the axle extension, the flexible spline coupling being capable of transmitting high torque while permitting a small degree of angular misalignment between the axis of the axle and the axis of the axle extension. Also according to the invention, self-aligning bearings are provided for journaling the outer ends of the axle extensions in the respective track frames.

Another feature of the invention resides in the provision of sealed housings for both the bearings and the flexible splined couplings, so that both the bearings and the couplings will retain lubrication.

BRIEF DESCRIPTION OF THE DRAWINGS

FIG. 2 is a vertical section through the axis of the outer end of the right drive axle and the axle extension.

DESCRIPTION OF THE PREFERRED EMBODIMENT

Figure 1:
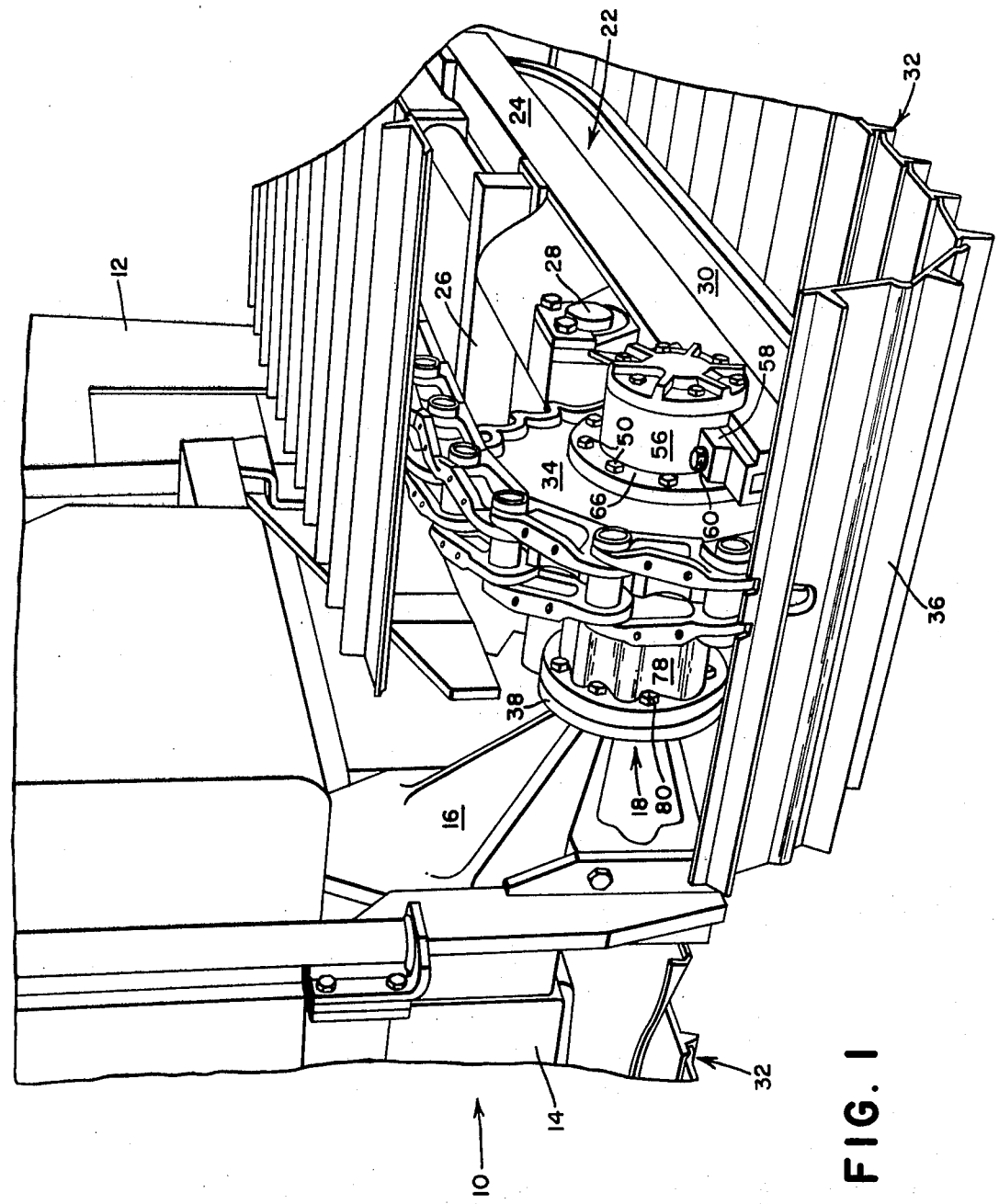
FIG. 1 is a partial right rear perspective view of a crawler-type tractor embodying the present invention, a number of the track shoes on the right track being removed to expose the right drive sprocket and axle extension.

The invention is embodied in a crawler-type tractor, only a portion of which is shown in FIG. 1. As is conventional, the tractor includes a main frame, indicated in its entirety by the numeral 10, with a forward engine (not shown) mounted in an engine enclosure 12, behind which an operator's station (not shown) is conventionally located. A rear transmission housing 14, only a portion of which is shown, is located below the operator's station and houses a pair of steering clutches and brakes on opposite sides of a bevel gear, driven by the engine through a conventional transmission, all of which are not shown. A pair of final drive housings 16 are attached to the opposite sides of the rear transmission housing 14 and enclose final drive gearing (not shown), which are driven through the steering clutches in the conventional manner and drive transversely extending drive axles 18, extending laterally outwardly through the final drive housings 16.

Since only the right side of the machine is shown in the drawings, and since the tracks and the drives therefor are substantially identical on both sides of the machine, only the right-hand track and track drive will be described herein.

A pair of elongated fore-and-aft extending track frames 22 are disposed on opposite sides of the main frame 10, and each track frame 22 is principally formed by a fore-and-aft extending beam 24, which is substantially rigidly connected to the main frame by a transversely extending front beam 26 and a rearward cylindrical beam 28. The above-described rigid connection of the track frame to the main frame is, of course, conventional only for smaller tractors, many of the larger crawler tractors having a track suspension wherein the track frames swing to a limited degree in a vertical arc about the axis of the rearward drive shafts. Each track frame typically carries a front idler (not shown) and a plurality of rollers (also not shown) which are suspended below the track frame beam 24 and are shielded by a track roller guard 30.

As is also conventional, a pair of endless tracks 32 are respectively trained around the front idlers, the track rollers, and a pair of drive sprockets 34, each drive sprocket meshing with the its respective track in a well known manner, so that the tracks are continuously picked up and laid down as the drive sprockets rotate, the vehicle being supported on the tracks via the track rollers and idlers attached to the track frames. The track elements are more or less conventional and will not be described in detail with the exception of the track shoes 36, which are extra wide shoes approximately 33 inches in width, as opposed to the usual type of track shoes which vary between 10 and 20 inches in width for the illustrated size tractor. As is apparent, the extra wide shoes 36 provide a much larger area of contact with the ground, providing superior flotation on snow or other soft footings compared to the more standard shoe size.

The outer end of each drive axle 18 is provided with a radial flange 38 having a plurality of threaded bores 40 equiangularly spaced about the periphery of the flange and extending parallel to the axis of the axle. An axle extension member 42 is coaxially connected to the outer end of each drive axle 18 and extends outwardly therefrom. Each axle extension member 42 includes an axial shaft 44 with a radial flange 46 adjacent its outer end. The radial flange 46 is substantially identical to the drive axle flange 38 and has a plurality of threaded bores 48 around its outer periphery similar to the threaded bores 40. The drive sprocket 34 is coaxially attached to the flange 46 by means of bolts 50, which extend through corresponding holes in the drive sprocket and are threaded into the threaded bores 48 in the flange 46. When the narrower, standard size track shoes are used, the drive sprocket 34 is bolted to the drive axle flange 38 rather than to the flange on the axle extension member 42. As is apparent, the use of the axle extension member shifts the drive sprocket a substantial distance outwardly to accommodate the wider track shoes 36.

The axle extension member also includes an outer stub shaft 52 outwardly of the flange 46, the outer stub shaft 52 being journaled in a self-aligning bearing 54 mounted in a housing 56 attached to the top of the track frame beam 24. As is apparent, the housing 56 is generally cup-shaped and encloses the outer end of the stub shaft 52. The housing 56 includes a pair of mounting flanges 58, which respectively extend forwardly and rearwardly from the housing and are fastened to the top side of the track frame beam 24 by means of bolts 60. The bearing 54 has an inner race 62, clamped to the end of the stub shaft 52, and an outer race 64, attached to the interior of the housing 56, the arcuate configuration of the inner surface of the outer race permitting angular tilting of the inner race relative to the outer race, so that the bearing 54 journals the outer end of the axial extension member 42 even though the axle extension member tilts relative to the track frame. An annular plate 66 is coaxially bolted to the exterior side of the drive sprocket 34 via the bolts 50 opposite the open end of the housing 56, and a pair of mating seals 68, respectively mounted in the housing and in the plate 66, seal the interior of the housing, so that the housing may be filled with lubricant for the bearing 54. The seals 68 are of conventional construction, the relative motion between the rotating plate 66 and the fixed housing 56 occurring between the two seals.

An annular hub 70 is coaxially splined to the inner end of the axle extension member 42 and is retained thereon by a cap 72 bolted to the end of the axle extension member shaft 44. The hub 70 is provided with an arcuate convex external spline 74, which meshes with a straight internal spline 76 on the interior of an annular housing 78, which is coaxially bolted to the outer end of the drive axle 18 by means of bolts 80 threaded into the threaded bores 40 and extending through corresponding holes around the periphery of the housing 78. The housing 78 has a circular opening 82 at its outer end through which the axle extension member shaft 44 extends, and a flexible oil seal 84 is coaxially mounted on the shaft 44 to seal the space between the shaft and the housing opening 82. Since the housing 78 is closed at one end by the axle flange 38 and the other end by the seal 84, the housing can be filled with grease to maintain lubrication for the meshing splines 74 and 76.

The flexible coupling provided by the arcuate external spline and the straight internal spline permits the axle extension member to tilt relative to the drive axle. In the preferred embodiment, the flexible coupling provides up to 2 ½° of angular misalignment. Thus, the combination of the flexible coupling provided by the meshing splines 74 and 76 and the self-aligning bearing 54 permit substantial misalignment between the drive axle 18 and the bearing housing 56. The flexible seal 84 also permits a tilting of the shaft 44 relative to the housing 78, so that the housing retains its lubricant even when the drive axle and axle extension member are misaligned.

The constantly meshing splines 74 and 76 permit the transmission of a high torque, as is required to drive the drive sprocket 34, while the flexible coupling provided by the meshing splines and the self-aligning bearing permit the support of the axle extension member at both ends, so that a large radial load can also be supported. Thus, a considerable misalignment between the outer bearing 54 and the drive axle 18, as a result of deflections in the frame members during operation of the machine, or as a result of manufacturing and assembly tolerances, can be accommodated without affecting the strength or durability of the drive.

I claim:

1. In crawler vehicle having a main frame, a pair of longitudinally extending track frames respectively supporting a pair of tracks on opposite sides of the main frame and including longitudinally extending beam members on opposite sides of the main frame, means for connecting the beam members to the main frame to support the main frame above the ground, and a pair of drive axles extending laterally from the opposite sides of the main frame, the improvement comprising: a pair of axle extension members respectively extending outwardly from the outer ends of the drive axles generally coaxial therewith; means respectively drivingly connecting the inner ends of said axle extension members to the outer ends of the drive axles for limited tilting of the extension member relative to the axles; bearing means respectively journaling the outer ends of the axle extension members in the respective track frames; and a pair of drive sprockets respectively mounted on the respective axle extension members and drivingly engaging the respective tracks.

2. The invention defined in claim 1 wherein the tracks are relatively wide high-flotation tracks at least 25 inches in width and the drive sprockets engage the approximate centers of the respective tracks.

3. The invention defined in claim 1 wherein the bearing means include self-aligning means to permit said limited tilting of the axle extension members.

4. The invention defined in claim 3 wherein each of the means connecting the outer ends of the axles to the respective axle extension members includes an annular housing having an internal spline coaxially affixed to the outer end of the axle and an externally arcuately splined member coaxially connected to the inner end of the axle extension member and meshing with the internal spline.

5. The invention defined in claim 4 and including seal means between each annular housing and the respectivy axle extension member outwardly of the meshing splines for forming a sealed chamber around said splines.

6. The invention defined in claim 5 wherein the seal means includes a flexible element adapted to accommodate the tilting of the axle extension member.

7. The invention defined in claim 3 wherein each drive axle includes a flange at its outer end and each axle extension member includes a flange at its outer end substantially identical to the flange on the axle, the respective sprockets being mounted on the respective axle extension member flanges when the axle extension members are attached to the respective axles.

* * * * *